Patented June 12, 1951

2,556,856

UNITED STATES PATENT OFFICE 2,556,856

METHOD OF REACTING ALKYL MERCAPTANS WITH SYNTHETIC RUBBERY DIOLEFIN POLYMERS

Miller W. Swaney, Cranford, and Fred W. Banes, Roselle, N. J., assignors to Standard Oil Development Company, a corporation of Delaware No Drawing. Application December 29, 1945, Serial No. 638,519

6 Claims. (Cl. 260—83.3)

The present invention pertains to the production of derivatives of synthetic rubber-like materials.

Synthetic rubber-like materials have been prepared by the polymerization of a conjugated diolefin or mixtures of conjugated diolefins or mixtures of one or more conjugated diolefins with unsaturated comonomers, capable of forming copolymerizates with diolefins under the reaction conditions applied. Diolefins used for this purpose have included butadiene-1,3, isoprene, piperylene, dimethyl butadiene and the like. Unsaturated comonomers which may be used include styrene, homologues of styrene such as alpha methyl styrene, para methyl styrene, alpha methyl para methyl styrene, chloro- or bromo styrenes, acrylonitrile, methacrylonitrile, acrylic acid esters such as methyl acrylate or methyl methacrylate and unsaturated ketones such as methyl vinyl ketone and the like.

Although most of these materials have been polymerized by the action of sodium or alkali metals and by heat or mass polymerization, it has been most customary to effect the polymerization in aqueous emulsion. In the latter case, the monomers are emulsified in from an equal to a two-fold quantity of water containing about 0.25 to about 5% based on the water of an emulsifier such as water-soluble soap or a sulfonate-type surface active agent. Polymerization is catalyzed by a trace of a per-type compound which is active under the reaction conditions such as hydrogen peroxide, benzoyl peroxide, perborates or persulfates of ammonia or the alkali metals. There is preferably provided in the reaction mixture a small amount, i. e., about 0.1 to 1% based on the monomers of a polymerization modifier such as aliphatic mercaptans containing at least six and up to about eighteen carbon atoms per molecule. The pH of the emulsion is usually adjusted to between about 7 and 10 when using soap-type emulsifiers although this polymerization may be carried out at a pH below 7 by using amine salts such as dodecyl amine hydrochloride as the emulsifier. The polymerization is carried out at temperatures of about 20–60° C. until about 75% conversion of the monomers to polymers is effected.

The resultant polymers have found numerous applications as substitutes for natural rubber and in view of certain properties have been found to be vastly superior to natural rubber for certain purposes. One of the serious drawbacks to synthetic rubbery materials obtained in this manner has been their instability. For example, polybutadiene and rubbery copolymers of butadiene with styrene, acrylonitrile, or the like have been found to heat harden or resinify when heated to about 250–275° C. in the absence of air for a suitable length of time. Although this is a desirable property in the preparation of hard, resinous materials, it is a definite disadvantage when the material is being used because of its soft, elastic or rubbery qualities.

It is the object of this invention to prepare derivatives of synthetic rubber-like polymers which do not resinify when heated to 250–275° C. in the absence of air but which retain the other rubber-like properties of the polymers.

It is also the object of this invention to prepare derivatives of synthetic rubber-like polymers which are incapable of cyclizing under the action of heat but which are capable of vulcanization in substantially the same way as the original polymers.

It is a further object of this invention to provide the art with certain novel, rubber-like polymer derivatives having new and highly advantageous properties.

These and other objects will appear more clearly from the detailed description and claims which follow.

We have now found that when latices of synthetic rubber-like polymers obtained by the polymerization of diolefins in aqueous emulsion are treated with aliphatic mercaptans containing at most 10 carbon atoms per molecule, in the absence of molecular oxygen, the mercaptan reacts selectively with only the vinyl side groups attached to the polymer molecules and not with the double bonds in the chain proper. In this way, the vinyl side groups are filled up or deactivated thereby eliminating all of the undesirable faults in these polymers which are attributable to these vinyl side groups. For example, while butadiene-styrene emulsion copolymers will heat-harden or resinify by cyclizing or crosslinking action through the vinyl side groups when heated to temperatures of 250–300° C. in the absence of air, the same polymer treated with ethyl mercaptan, in accordance with the present invention, does not cyclize or resinify when so heat treated. The mercaptan-treated polymers of the present invention possess a greater degree of stability than the original polymers and since the double bonds in the polymer chain itself are unaffected by the treatment, the treated polymers may be cured by treatment with sulfur or other vulcanizing agent the same as the untreated polymers. By treating these emulsion polymerizates with these low molecular weight mercaptans which have the property of reacting selectively with the vinyl side groups, we have found a means of preparing very selective chemical derivatives of these polymers which not only retain all the desirable properties of the original polymers but actually become superior thereto in certain respects.

This treatment of the finished latex with aliphatic mercaptans in the absence of molecular oxygen in accordance with the present invention is very different from and should not be confused with the use of mercaptans as polymerization modifiers or the treatment of these polymers in the dry state with aryl mercaptans or the treatment of these polymers with aliphatic mercaptans in the presence of molecular oxygen.

The use of aliphatic mercaptans as polymerization or chain modifiers in emulsion polymerization for the production of synthetic rubber is, of course, well known. For this purpose, aliphatic mercaptans containing at least six carbon atoms in the molecule are added to the reaction mixture at the start or stepwise during the polymerization reaction. It is essential in this process to utilize mercaptans containing at least six and preferably about twelve carbon atoms per molecule, since lower mercaptans act as poisons to the polymerization reaction or retard it to such a degree that polymer formation is prevented. The function of the mercaptan modifiers in polymerization reactions of this type is to regulate the polymerization so that very plastic, non-gelled rubbers of much better benzene solubility are formed. This is accomplished largely through chain termination and at the expense of molecular weight. For this purpose, relatively small amounts of mercaptans, i. e., up to about 1 to 2% based upon the monomers are used.

It has also been proposed to plasticize various synthetic rubbers by hot mastication in the presence of aromatic mercaptans (thiophenols). For example, the rubbery material is heated to a temperature of 200–300° F. on mill rolls or in a Banbury masticator while adding thereto about 0.5–2% of an aromatic mercaptan such as xylyl mercaptan or thio- beta-naphthol. Under these circumstances a plasticization of the polymer is effected but by an entirely different means from that involved in the production of plastic rubbers through the use of aliphatic mercaptans such as dodecyl mercaptan during the polymerization reaction. The function of the mercaptan during the hot mastication of the polymers is generally presumed to be that of aiding oxidative cleavage of the polymer molecule thereby leading to lower molecular weight and consequently more plastic polymers.

It has also been proposed to react or condense synthetic rubber-like polymers with aliphatic or substituted aliphatic mercaptans such as butyl, amyl, octyl, dodecyl, octadecyl benzyl mercaptans and the like by adding the latter to the dry polymer while the same is being masticated on a rubber mill at or near room temperature although higher temperatures can be tolerated and may be employed. The condensation can be accelerated by adding traces of such catalysts as benzoyl peroxide, piperidine, etc. This condensation of mercaptans with synthetic rubbery polymers involves reactions of the mercaptan at the double bonds of the polymer molecule and therefore is distinctly different from the use of mercaptan modifiers during polymerization or the use of aromatic mercaptans in hot mastication of the polymers. The condensation of these higher mercaptans with these polymers is similar to that effected in accordance with the present invention but is not selective since said mercaptans condense at the double bonds in the chain proper as well as the vinyl side groups when the reaction is carried out in the presence of molecular oxygen. Accordingly, the amount of mercaptan added must be limited and the products obtained do not possess the advantages of the products of the present invention, since they still contain unaltered or active vinyl side groups which can still exert their deleterious effects upon the polymer.

The polymers that may be treated in accordance with the present invention are those prepared by the polymerization in aqueous emulsion of conjugated diolefins such as butadiene, isoprene, piperylene, dimethyl butadiene, methyl pentadiene, and the like taken singly or in combination or admixtures of one or more such diolefins with comonomers such as styrene, alpha methyl styrene, para methyl styrene, alpha methyl para methyl styrene, chloro or bromo styrenes, acrylonitrile, methacrylonitrile, methyl or ethyl acrylate, methyl methacrylate, ethyl fumarate, methyl vinyl ketone, methyl isopropenyl ketone and the like, which are copolymerizable with butadienes-1,3 in aqueous emulsion.

The polymers or copolymers may be prepared in any well known manner as by emulsifying the monomer or mixture of monomers in from about an equal to a twofold quantity of water using a suitable emulsifying agent to assist in the formation of a stable dispersion. As emulsifying agent we may use water soluble soaps, i. e., alkali metal or ammonium salts of stearic, palmitic, oleic or selectively hydrogenated tallow acids, alkali metal salts of alkylated benzene or naphthalene sulfonic acids or fatty alcohol sulfates. The amount of emulsifier is ordinarily about 1% to 5% based upon the water in the polymerization mixture. The polymerization may be accelerated by the incorporation in the reaction mixture of about 0.1% to about 0.3% based on the water present of a polymerization catalyst such as hydrogen peroxide, benzoyl peroxide, alkali metal or ammonium perborates or persulfates.

A polymerization modifier is preferably provided in the reaction mixture during the polymerization reaction in amounts of between about 0.125 and about 0.5% based on the water present. Suitable modifiers include aliphatic mercaptans containing at least six carbon atoms per molecule such as hexyl, octyl, dodecyl, octadecyl mercaptans, benzyl mercaptan and the like.

The polymerization is effected by maintaining the reaction mixture under agitation at temperatures between about 20 and about 65° C. until the monomers are at least 70–75% converted to high molecular weight polymers. The pH of the emulsion is ordinarily adjusted to between about 7.5–10 when soap-type emulsifiers are used. The pH may be adjusted to about 6.5 to 7.5 when using sulfonate or similar surface active agents and even lower when using acid-type emulsifiers such as dodecyl amine hydrochloride.

Upon completion of the polymerization, the pressure upon the reaction mixture is released and the volatile materials are vented off. The resultant latex may then be stripped of unreacted monomers by means of steam or vacuum distillation or by merely passing a suitable stripping gas such as nitrogen through the latex at or slightly above room temperature for a suitable length of time.

The reaction of the mercaptan with the polymer can be effected by adding the mercaptan to the latex and permitting the latex to stand with or without agitation out of contact with air or molecular oxygen until the reaction is completed. The temperature of the reaction mixture may be as low as room temperature or as high as 50–60° C. At about 50° C., the quantity of mercaptan that reacts with the polymer latices appears to reach a constant value after about six hours.

The mercaptan which we prefer is ethyl mercaptan although other aliphatic mercaptans containing at most ten carbon atoms per molecule such as methyl, normal propyl, butyl, amyl, octyl, isopropyl or decyl mercaptans may also be used. In lieu of using a pure or single mercaptan, we may also use mixtures of the said mercaptans. In view of the fact that the mercaptans are selective in their action, a substantial excess thereof may be added to the latex without reacting with the double bonds in the polymer chain rather than in the vinyl side groups. The amount of mercaptan added may, of course, be limited when it is desired to fill up only part of the vinyl side groups.

The following examples are illustrative of our invention. It should be understood, however, that our invention is not limited to the specific conditions disclosed since numerous variations are possible without departing from the scope of our invention.

EXAMPLE 1

A sample of latex was prepared by polymerizing in emulsion, a mixture of 75 parts high purity (99%) butadiene and 25 parts of styrene, while emulsified in 200 parts of 2½% soap solution containing 0.3 part of $K_2S_2O_8$ and 0.5 part of $C_{12}$ mercaptan. This mixture was agitated at 43° C. for 22 hours whereupon a 63% conversion to polymer was obtained. The final latex was vacuum stripped at room temperature to remove unreacted monomers and contained about 25% solids content. The stripped, but unstabilized latex was returned to the reactor and 0.15 part of ethyl mercaptan per part of rubber added. The mixture was then heated with agitation for 46 hours at 50° C. The latex was then stabilized with 0.2 part of hydroquinone and stripped at 60° C. to remove unreacted mercaptan. The latex was then coagulated, washed thoroughly to remove further unreacted mercaptan and then dried. Sulfur analysis showed that approximately 23% of the total double bonds in the polymer had reacted with the mercaptan.

EXAMPLE 2

An emulsion synthetic polymer was prepared from 26 parts of acrylonitrile and 74 parts of butadiene in a manner similar to that described in Example 1. The stripped latex, however, was divided into two equal portions. One-half was worked up in the conventional manner. The other half was treated with excess ethyl mercaptan as described in Example 1 and the polymer later recovered as usual. It contained 4.97% sulfur corresponding to a reaction with approximately 13% of the double bonds of the polymer, the side vinyl groups. Both fractions were subjected to compounding and vulcanization and physical evaluation in a conventional type of black-loaded recipe (polymer 100 pts.; carbon black, 45; softener, 9.5; stearic acid, 1.5; ZnO, 5; benzothiazyl disulfide, 1.25; DPG, 0.25; S, 1.5). When cured at 15 and 30 minutes the following properties were obtained on the vulcanizates:

|  | Tensile Strength—300% Modulus—Ult. Elongation, Per Cent | |
|---|---|---|
|  | 15' cure at 287° F. | 30' Cure at 287° F. |
| Polymer | 3045#—210#—1000% | 3730#—385#—845% |
| Polymer—Ethyl Mercaptan Adduct | 2875#—290#—940% | 3880#—530#—815% |

It appears from these results that the reaction of the polymer with ethyl mercaptan not only did not impair the curing properties of the polymer but gave products having a higher modulus and in the case of the 30 minute cure a higher tensile strength and only slightly lower ultimate elongation than the control.

EXAMPLE 3

A number of different emulsion polymers were prepared in pressure bottles using substantially the same technique described above in Examples 1 and 2. When the desired conversion was reached, the latex, without added short-stop or anti-oxidant, was transferred directly to a vacuum stripping apparatus and stripped with the aid of a nitrogen stream for 3 hours at a pressure of about 10 mm. Hg. and lower, at room temperature and below. The stripped latex was then returned to a pressure bottle and an excess of liquid ethyl mercaptan added. After attaching a cap fixed with a draw-off tube, the bottle was returned to a bath at 50° C. and agitated for given periods of time. In order to follow the addition of mercaptan with time, the polymerization bottle was removed from the bath at intervals and samples withdrawn for analysis. The reacted latex was short-stopped with 0.2% hydroquinone and stripped of unreacted mercaptan with the aid of a nitrogen stream for 6–7 hours at 70° C. although most of the excess mercaptan was removed in a much shorter time. The latex was then coagulated with brine and alcohol, mill washed and then mill dried at 165° F. To further insure the removal of all unreacted mercaptan, the polymers were dissolved in benzene and reprecipitated with alcohol. From the difference in sulfur content of the treated and untreated polymers, the percentage of double bonds reacting with ethyl mercaptan was calculated using the relations:

Polybutadiene and butadiene copolymers:

$$\text{Per cent reacted double bonds} = \frac{169S}{B(100-1.94S)}$$

Polyisoprene and isoprene copolymers:

$$\text{Per cent reacted double bonds} = \frac{212S}{I(100-1.94S)}$$

S=Percent S in treated polymer—percent S in untreated polymer
B=Percent butadiene in untreated polymer
I=Percent isoprene in untreated polymer The results obtained in these tests as well as in tests with natural rubber latex are summarized in the following tables:

TABLE I

*Reaction of ethyl mercaptan with emulsion polymers*

| Type of Latex | Per Cent Conv. | React. Time at 50° C., Hrs. | Per Cent S in Product | Per Cent Double Bonds Reacted |
|---|---|---|---|---|
| | Per cent | | | |
| Polybutadiene | 85 | 1.5 | 4.77 | 8.96 |
| | | 6.8 | 5.06 | 9.50 |
| | | 24.0 | 5.46 | 10.45 |
| | | 46.0 | 5.44 | 10.44 |
| Polybutadiene | 65 | 3.0 | 5.21 | 9.9 |
| | | 19.0 | 6.89 | 13.4 |
| | | 40.0 | 7.20 | 14.1 |
| | | 64.5 | 7.16 | 14.0 |
| Polybutadiene | 68 | 19.0 | 7.00 | 13.6 |
| Butadiene-Styrene | 90 | 2.0 | 4.84 | 11.3 |
| | | 5.5 | 5.49 | 12.9 |
| | | 23.0 | 5.61 | 13.3 |
| | | 69.0 | 6.03 | 14.5 |
| Butadiene-Styrene | 52 | 23.3 | 9.67 | 25.2 |
| | | 46.3 | 10.27 | 27.2 |
| Butadiene-Styrene | 82 | 19.8 | 6.17 | 14.8 |
| | | 39.8 | 6.27 | 15.1 |
| Butadiene-Styrene | 63 | 46.0 | 8.97 | 23.0 |
| Butadiene-Acrylonitrile | 70 | 1.0 | 2.99 | 7.4 |
| | | 2.0 | 3.43 | 8.8 |
| | | 3.0 | 3.98 | 10.1 |
| | | 4.0 | 4.33 | 11.1 |
| | | 6.0 | 4.55 | 11.7 |
| | | 24.0 | 4.48 | 11.5 |
| | | 48.3 | 4.41 | 11.3 |
| Polyisoprene | 82 | 3.3 | 1.21 | 2.6 |
| | | 20.8 | 1.47 | 3.2 |
| | | 46.8 | 2.14 | 4.5 |
| Natural Rubber | | 20.0 | 0.95 | 2.0 |
| | | 64.0 | 0.59 | 1.2 |

These tests indicate that stripped emulsion polymer latices react rapidly with ethyl mercaptan up to approximately six hours reaction time at 50° C. and show only slight further addition up to 50–60 hours. This is clearly demonstrated by the results obtained with 70% conversion butadiene-acrylonitrile copolymers wherein the per cent of sulfur in the treated product increased rapidly to about 4.3–4.5% in 4–6 hours and remained substantially constant at this value even though the reaction was continued for an additional 42 hours.

The data further indicate that less ethyl mercaptan reacted with higher than with lower conversion polymers. This is shown by the fact that the "saturation value" of 85% conversion polybutadiene is 10.3% as compared to 14.5% for a sample of latex which had been carried to only 65% conversion. This inverse relation of mercaptan addition to polymer conversion is further demonstrated by the saturation values of 26% and 15% obtained with butadiene-styrene copolymer latices of 52% and 83% conversion respectively. This would appear to indicate that as polymerization proceeds, either the vinyl side groups disappear through intra- or intermolecular reaction or beyond a certain fairly low conversion level no more vinyl side groups are formed.

The saturation value of natural rubber latex was found to be about 2% and it is interesting to note that an 82% conversion polyisoprene latex gave a saturation value of less than 4%.

EXAMPLE 4

Two batches latex prepared by polymerization of 71 parts of butadiene and 29 parts of acrylonitrile in aqueous emulsion to 75% monomer conversion were stripped of monomers at 40° C. and 5 mm. mercury. Portions of these latices were reacted with an excess of ethyl mercaptan in 2 oz. prescription bottles at 50° C. The reacted latices were coagulated and washed free of unreacted mercaptan by pouring them slowly into a large excess of vigorously stirred isopropyl alcohol. The coagulates were dried in a vacuum oven at 65° C. and the per cent of total double bonds reacted calculated from the weight gained by the original polymer.

The data which follow illustrate the effect of atmospheric oxygen on the mercaptan addition to Buna N latices.

A. Latex: 75% conversion, 15.0% polymer.
Reaction: 4 hours at 50° C.

| Run | Per Cent Air Space in Reactor | Polymer Weight | | Per Cent of Total Double Bonds Reacting |
|---|---|---|---|---|
| | | Initial | Final | |
| 1 | 64.5 | 3.017 | 3.924 | 36.9 |
| 2 | 36.9 | 5.256 | 6.579 | 30.9 |
| 3 | 12.3 | 7.153 | 8.154 | 17.2 |
| 4 | 0.0 | 8.362 | 9.105 | 10.9 |

B. Latex: 75% conversion, 20.2% polymer.
Reaction: 20 hours at 50° C.

| Run | Per Cent Air Space in Reactor | Polymer Weight | | Per Cent of Total Double Bonds Reacting |
|---|---|---|---|---|
| | | Initial | Final | |
| 1[1] | 70.2 | 3.021 | 3.987 | 38.7 |
| 2[1] | 44.7 | 6.062 | 7.439 | 27.5 |
| 3[1] | 20.0 | 9.026 | 10.497 | 19.7 |
| 4[1] | 0.0 | 10.837 | 11.867 | 11.5 |
| 5[2] | 65.3 | 1.867 | 2.201 | 21.6 |
| 6[2] | 32.2 | 3.629 | 4.153 | 17.5 |
| 7[2] | 0.0 | 5.227 | 5.749 | 12.1 |

[1] Two ounce prescription bottle reactors.
[2] One ounce prescription bottle reactors.

These data show that the extent of reaction of polymer and ethyl mercaptan depends upon the free air space in the reactor and that when the reactors are completely filled, consistent values of 11–12% double bonds reacted are obtained.

EXAMPLE 5

A sample of latex was prepared by reacting butadiene and styrene (3/1 weight ratio) at 50° C. until a 73% conversion of monomers to polymer had been obtained. The latex was treated and reacted in a manner identical to that described for the butadiene-acrylonitrile latex (cf. Example 4).

The following data illustrate the effect of atmospheric oxygen on the extent of ethyl mercaptan addition to butadiene-styrene copolymer latex:

Latex: 73% conversion Buna S, 20.4% polymer.
Reaction: 65 hours at 50–80° C.

| Run | Per Cent Air Space in Reactor | Polymer Weight | | Per Cent of Total Double Bonds Reacting |
|---|---|---|---|---|
| | | Initial | Final | |
| 1 | 80 | 2.101 | 3.793 | 89.9 |
| 2 | 60 | 4.104 | 6.701 | 70.7 |
| 3 | 40 | 6.136 | 9.182 | 55.4 |
| 4 | 20 | 8.312 | 11.081 | 37.2 |
| 5 | 0 | 10.227 | 12.343 | 23.1 |

NOTE.—Reactions were carried out in 2 oz. prescription bottles.

EXAMPLE 6

Three batches of butadiene-acrylonitrile copolymer latex similar to that of Example 4 were prepared using the normal amount of persulfate (0.30% based on monomers), one half the normal amount of persulfate (0.15%), and twice the normal amount of persulfate (0.60%) in the initial charge. All three reactions were carried to 75% conversion. The latices were stripped and reacted with ethyl mercaptan in a manner previously described.

The following data indicate that the initial persulfate concentration of the latex does not affect the extent of the polymer mercaptan reaction.

| Run | Latex | Mercaptan | Per Cent Air Space in Reactor | Per Cent of Total Double Bonds Reacting |
|---|---|---|---|---|
| 1 | N Persulfate | Ethyl | 72 | 38.7 |
| 2 | do | do | 0 | 11.9 |
| 3 | 2×N | do | 72 | 39.9 |
| 4 | do | do | 0 | 12.1 |
| 5 | ½×N | do | 72 | 40.2 |
| 6 | do | do | 0 | 13.4 |

EXAMPLE 7

A latex prepared from butadiene and acrylonitrile was prepared as heretofore described. The latex was stripped at room temperature, without stabilization, to remove unreacted monomers under 5 mm. Hg. It was then divided into several portions and an excess of a different mercaptan added to each. After shaking for 48 hours at 50° C. each was stripped, coagulated, washed with alcohol, dried, and analyzed for sulfur. The data listed below show that about the same amount of reaction occurred in the case of each of the mercaptans used.

| Mercaptan Reacted with Butadiene-Acrylonitrile Copolymer Latex | Per Cent Sulfur in Final Rubber |
|---|---|
| Ethyl | 8.03 |
| n-Propyl | 8.70 |
| iso-Propyl | 7.00 |
| n-Butyl | 6.53 |

EXAMPLE 8

A latex prepared by the copolymerization of butadiene and acrylonitrile in the ratio of 74 to 26 in aqueous emulsion as described above (75% monomer conversion) was stripped of monomers and placed in unstabilized condition into one quart bottle reactors. An amount of mercaptan in excess of that necessary for complete saturation of the double bonds was added to each reactor, whereupon the reactors were maintained under agitation at 50° C. for 28 hours. At the end of the reaction period, the latex was withdrawn, coagulated and freed from unreacted mercaptan by dissolving and then reprecipitating with alcohol. The coagulate was then analyzed for sulfur and the percentage of double bonds reacting was calculated from the sulfur content. The data tabulated below show that about the same amount of reaction occurred with $C_8$ and $C_{10}$ mercaptans as was obtained previously with lower molecular weight mercaptans:

| Mercaptan Reacted with Butadiene-Acrylonitrile Latex | Per Cent Double Bonds in Polymer Reacted |
|---|---|
| Octyl Mercaptan | 12.3 |
| Decyl Mercaptan | 10.1 |
| Dodecyl Mercaptan | 3.3 |
| Tetradecyl Mercaptan | 1.6 |

The foregoing description contains a limited number of embodiments of the present invention. It will be understood, however, that these are merely illustrative and that numerous variations are possible without departing from the scope of the following claims.

What we claim and desire to secure by Letters Patent is:

1. In the method of producing derivatives of a synthetic rubber-like aqueous emulsion polymer of a conjugated diolefin having 4 to 6 carbon atoms, the improvement which comprises reacting a latex of said polymer, previously stripped of unreacted monomers, in a closed zone with an aliphatic mercaptan containing up to 10 carbon atoms per molecule in the absence of oxygen at a temperature ranging from room temperature to 80° C. for a period ranging from 1 to 65 hours, whereby the vinyl side groups of the polymer are selectively reacted with the mercaptan to the extent of up to about 23 percent of the total double bonds originally present in the polymer.

2. The method according to claim 1 wherein the mercaptan is ethyl mercaptan.

3. The method according to claim 1 wherein the polymer is a copolymer of a major proportion of butadiene and a minor proportion of styrene.

4. In the method of producing derivatives of a synthetic rubber-like aqueous emulsion copolymer of a major proportion of a conjugated diolefin having 4 to 6 carbon atoms with a minor proportion of acrylonitrile, the improvment which comprises reacting a latex of said copolymer, previously stripped of unreacted monomers, in a closed zone with an aliphatic mercaptan containing up to 4 carbon atoms per molecule in the absence of oxygen at a temperature ranging from room temperature to 80° C. for a period ranging from 4 to 24 hours, whereby the vinyl said groups of the copolymer react selectively with the mercaptan to the extent of 11 to 12 percent of the total double bonds originally present.

5. The method according to claim 4 wherein the diolefin is butadiene-1,3.

6. The method according to claim 5 wherein the mercaptan is ethyl mercaptan.

MILLER W. SWANEY.
FRED W. BANES.

REFERENCES CITED

The following references are of record in the file of this patent:

UNITED STATES PATENTS

| Number | Name | Date |
|---|---|---|
| 2,098,542 | Charch | Nov. 9, 1937 |
| 2,234,204 | Starkweather | Mar. 11, 1941 |
| 2,425,840 | Schulze | Aug. 19, 1947 |